(12) United States Patent
Gahler et al.

(10) Patent No.: US 7,441,998 B2
(45) Date of Patent: Oct. 28, 2008

(54) FASTENING ELEMENT FOR HARD CONSTRUCTIONAL COMPONENTS

(75) Inventors: Manfred Gahler, Koenigsbrunn (DE); Josef Glogger, Buchloe (DE); Franz Huber, Markt Wald (DE); Martin Volker, Feldkirch (AT); Michael Radl, Hohenems (AT); Juergen Wieser, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 49 days.

(21) Appl. No.: 11/514,024

(22) Filed: Aug. 30, 2006

(65) Prior Publication Data

US 2007/0053764 A1    Mar. 8, 2007

(30) Foreign Application Priority Data

Sep. 2, 2005    (DE)    ........................ 10 2005 000 108

(51) Int. Cl.
*F16B 37/04*    (2006.01)
(52) U.S. Cl. ...................................... 411/178; 411/403
(58) Field of Classification Search ................. 411/178, 411/403, 411, 386
See application file for complete search history.

(56) References Cited

U.S. PATENT DOCUMENTS

| | | | | |
|---|---|---|---|---|
| 1,082,252 A * | 12/1913 | Ackermann | .................. | 238/297 |
| 2,499,146 A * | 2/1950 | Kindt | .......................... | 411/403 |
| 2,742,074 A * | 4/1956 | Rosan | ......................... | 411/109 |
| 3,190,169 A * | 6/1965 | Rosan | ......................... | 411/403 |
| 4,295,765 A * | 10/1981 | Burke | .......................... | 410/101 |
| 4,906,151 A * | 3/1990 | Kubis | .......................... | 411/178 |
| 6,406,239 B1 * | 6/2002 | Mauri | ........................ | 411/383 |
| 6,662,511 B1 * | 12/2003 | Alty | ............................. | 52/202 |
| 7,056,075 B2 * | 6/2006 | Powers et al. | ............... | 411/178 |
| 2004/0096291 A1 * | 5/2004 | Reiter | ........................ | 411/178 |

* cited by examiner

*Primary Examiner*—Flemming Saether
(74) *Attorney, Agent, or Firm*—Abelman, Frayne & Schwab

(57) ABSTRACT

A fastening element for hard constructional components includes a cylindrical base body (22), a self-tapping thread (27) provided at least on a portion of an outer surface (26) of the base body (22) and having a runout (28) that is spaced from a first end (24) of the base body (22) to provide a thread-free section (31) on the outer surface (26) of the base body (22) and extending from the first end (24) in a direction of a second end (25) of the base body (22), and an inwardly located engagement element (32) for a setting bit (13) arranged in a region of the thread-free section (31) and having an axial extent (F) smaller than an axial extent (E) of the thread-free section (31), and a receptacle opening (33) that opens toward the second end (25) and adjoins the engagement element (32) in the direction of the second end (25), and is provided with load application element (34).

3 Claims, 2 Drawing Sheets

FASTENING ELEMENT FOR HARD CONSTRUCTIONAL COMPONENTS

BACKGROUND OF THE INVENTION

1. Field of the Invention

The present invention relates to a fastening element for hard constructional components such as concrete, masonry and the like and including a cylindrical base body extending along a longitudinal axis and having a first end and a second end opposite from the first end, a self-tapping thread provided, at least regionwise, on the outer surface of the base body and having a runout spaced from the first end to provide a thread-free section extending from the first end and in the direction of the second end, inwardly located engagement means for the setting bit, and an opening that is open toward the second end of the base body and, adjoins the engagement means in a direction toward the second end, and load application means.

2. Description of the Prior Art

Fastening elements of the type described above are used for attachment of objects to the hard constructional components such as concrete, masonry, and the like. A fastening element is screwed in a preliminary formed borehole with a suitable setting bit, with the self-tapping thread forming a complementary thread in the constructional component or in the borehole wall. The fastening elements is anchored in the constructional component by the undercut formed by the complementary thread. The load application means, which is provided in the receptacle, is formed, e.g., as an inner thread into which an attachment element, such as e.g., a threaded rod or a screw is screwed in to form an attachment. Instead of the inner thread, a bayonet joint can be used.

International Application WO 01/88387 A1 disclose a fastening element described above. The fastening element has a cylindrical base body extending along a longitudinal axis and having a first end facing in a setting direction and an opposite second end. On the outer surface of the base body, there is provided a self-tapping thread with three cutter helically circumferentially circumscribing the base body at an end region at the first end and which form a three-point support. The base body has inwardly located engagement means for a setting bit, and a receptacle opening that opens toward the second end and adjoins the engagement means in a direction of the first end, and is provided with load application means formed as an inner thread.

The drawback of the above-described fastening element consists in that as a result of the arrangement of the engagement means at the second end of the base body, the fastening element has a tendency to tilt during a setting process. This makes the setting process more difficult and widens the borehole mouth in an undesirable manner.

European Publication EP 1 536 149 A2 discloses a fastening element of a type described above. The known fastening element has a cylindrical base body having a first, facing in the setting direction, end with a bottom section and a second and remote from the first end. On the outer surface of the base body, a self-tapping thread is provided. The base body has inwardly located, engagement means for the setting bit and a receptacle opening to the second end and adjoining, in the direction toward the second end, the engagement means. The receptacle is provided with an inner thread that forms load application means. In the end region of the first end, the engagement means is arranged at the same axial height of the base body as the thread runout of the self-tapping screw.

The drawback of the known fastening element consists in that formation of the engagement means at the bottom of the receptacle is connected with increased manufacturing costs, being costs-intensive. Further, with such fastening element, manufacturing possibilities are limited. Actually, at a mass production, for which such fastening elements are suited, an economical manufacturing is an important competitive advantage.

Accordingly, an object of the present invention is to provide a fastening element for hard constructional components with which the tendency to tilting is eliminated to a most possible extent.

Another object of the present invention is to provide a fastening element for hard constructional components and which can be economically produced.

SUMMARY OF THE INVENTION

This and other objects of the present invention, which will become apparent hereinafter, are achieved by providing a fastening element in which the inwardly located engagement means is arranged in a region of the thread-free section and has an axial extent smaller than an axial extent of the thread-free section.

The thread-free section of the inventive fastening element aligns the fastening element when it is driven into a borehole and centers it against the radial forces that act on the fastening element and which are generated during tapping of the complementary thread in the borehole wall, which radial forces, otherwise, could lead to deflection of the fastening element and a resulting wobbling of the fastening element. The arrangement of the inwardly located engagement means in the region of the thread-free section insures that the torque produced by the setting tool is deflected from the borehole mouth and transmitted to the fastening element through the thread-free section, whereby the tendency to tilting is further reduced.

Further, the thread-free section provides an additional fixing possibility over the circumference of the base body for producing the inventive fastening element. Thereby, the already formed engagement means for the setting bit is protected against deformation when the self-tapping thread is formed. Thereby, the number of manufacturing possibilities is noticeably increased, and incorporation of further developments in the manufacturing process becomes possible. All of this results in an economical and, therefore, cost-effective production of fastening elements.

The load application means extends advantageously from the second end of the base body up to the engagement means so that the entire section of the base body from the second end to the engagement means is available for transmitting a load. According to one embodiment, the load application means extends, in the opening, at a distance from the engagement means and/or the second end.

Advantageously, the axial extent of the thread-free section amounts at least to 0.5 times of a core diameter of the base body.

This insures an adequate guidance and centering of the fastening element during driving of the fastening element in or its setting. In addition, this embodiment provides an adequate circumferential surface for gripping the fastening element during its manufacturing. Under a core diameter is understood, in this case, the outer diameter of the cylindrical base body without the thread or the diameter of the thread root.

Advantageously, the thread-free section has a region with a conical profile. With a conical profile, driving of the fastening element in and, thus, its setting is facilitated.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

In the drawings the same part as designated with the same reference numerals.

DETAILED DESCRIPTION OF THE PREFERRED EMBODIMENTS

Figure 1:
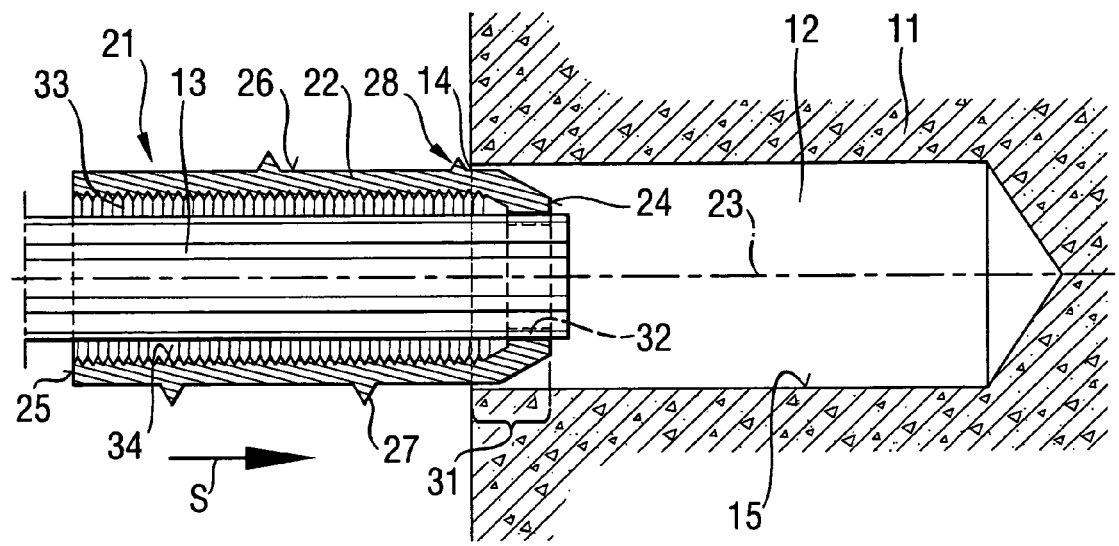
FIG. 1 a cross-sectional view of a fastening element according to the present invention at the beginning of a setting process.
Figure 2:
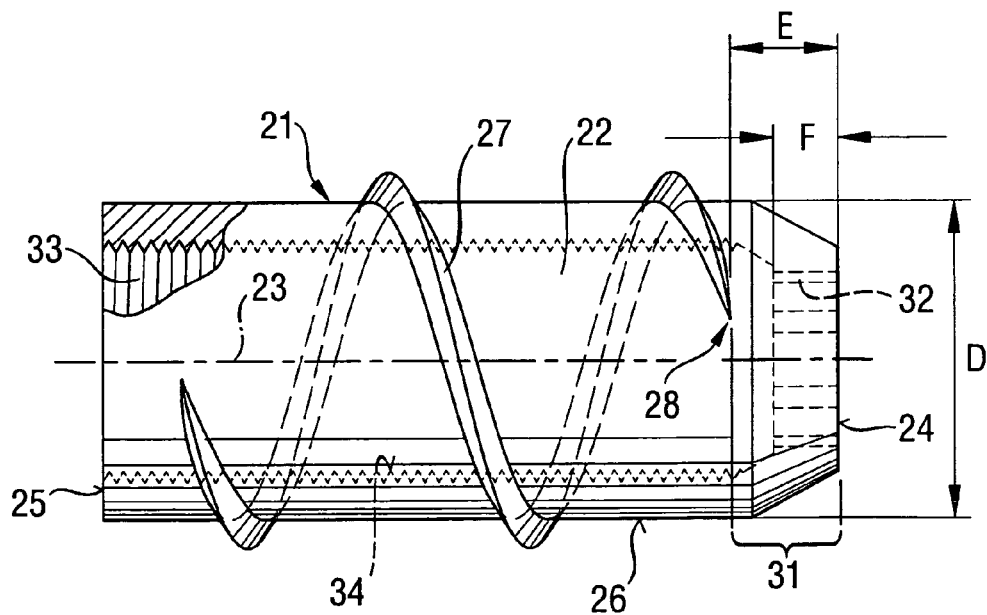
FIG. 2 a side view of the fastening element according to the present invention.

A fastening element 21 for hard constructional component 11, which is shown in FIGS. 1-2, has a cylindrical base body 22 that extends along a longitudinal axis 3 and has a first end 24 facing in a setting direction S and a second opposite end 25. On an outer surface 26 of the base body 22, there is provided a self-tapping thread 27 having a runout 28 which is spaced from the first end 24 to provide a thread-free section 31 that extends from the first end 24 in a direction of the second end 25. The base body 22 further has inwardly located engagement means 32 for a setting bit 13, a receptacle opening 33 that is open toward the second end 25, adjoins, in the direction of the second end 25, the inwardly located engagement means 32, and is provided with an inner thread that serves as load application means 34.

Figure 3:
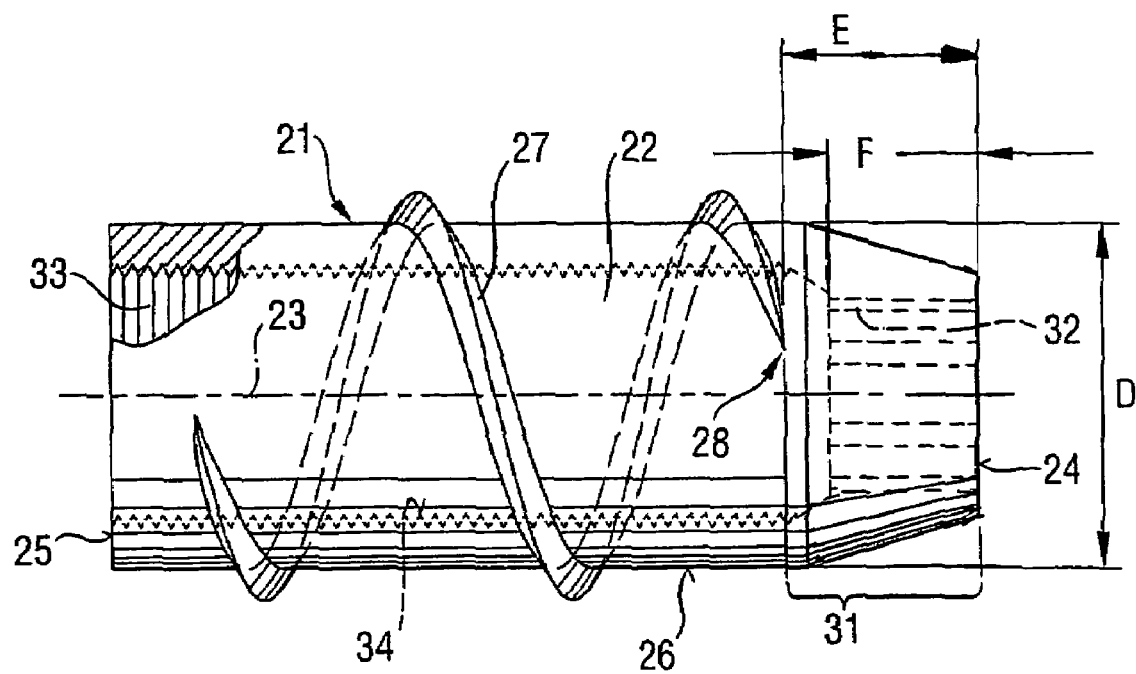
FIG. 3 a side view of the fastening element according to another embodiment of the present invention.

The thread-free section 31 has an axial extent E that is larger than an axial extent F of the inwardly located engagement means 32 that is located in the region of the thread-free section 31. In one embodiment, which is shown in FIG. 3, the axial extent (E) of the thread-free section (31) amounts at least to 0.5 times of a core diameter (D) of the base body (22). In another embodiment, the axial extent E of the thread-free section 31 corresponds to 0.7 times of the core diameter D of the base body 22. A region of the thread-free section 31 has a conical profile.

For setting the fastening element 21, a borehole 12 is formed in the hard component 11, here, e.g., a concrete component, and the fastening element 21 is driven therein until the runout 28 of the self-tapping thread 27 engages the borehole mouth 14. A suitable setting bit 13 transmits, through the engagement means 32, a torque to the fastening element 21 and screws the fastening element 21 into the borehole 12, whereby the self-cutting thread 27 forms a complementary thread in the wall 15 of the borehole 12 to produce an undercut.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A fastening element for hard constructional components, comprising a cylindrical base body (22) extending along a longitudinal axis (23) and having a first end (24) facing in a setting direction (S) and an opposite second end (25); a self-tapping thread (27) provided at least on a portion of an outer surface (26) of the base body (22) and having a runout (28) that is spaced from the first end (24) of the base body (22) to provide a thread-free section (31) on the outer surface (26) of the base body (22) and extending from the first end (24) in a direction of the second end (25), wherein the base body (22) further has inwardly located engagement means (32) for a setting bit (13) and arranged in a region of the thread-free section (31) and having an axial extent (F) smaller than an axial extent (E) of the thread-free section (31), a receptacle opening (33) that opens toward the second end (25) and adjoins the engagement means (32) in the direction of the second end (25), and is provided with load application element (34).

2. A fastening element according to claim 1, wherein the axial extent (E) of the thread-free section (31) amounts at least to 0.5 times of a core diameter (D) of the base body (22).

3. A fastening element according to claim 1, wherein the thread-free section (31) has a region having a conical profile.

* * * * *